United States Patent [19]

Sakai

[11] Patent Number: 4,905,185
[45] Date of Patent: Feb. 27, 1990

[54] APPARATUS FOR TRANSFERRING BLOCK DATA IN ORIGINAL FORM AND EDITING THE BLOCK DATA

[75] Inventor: Toshinari Sakai, Oome, Japan

[73] Assignee: Kabushiki Kaisha Toshiba, Kawasaki, Japan

[21] Appl. No.: 73,450

[22] Filed: Jul. 14, 1987

[30] Foreign Application Priority Data

Jul. 17, 1986 [JP] Japan ................................. 61-166753

[51] Int. Cl.$^4$ .......................... G06F 3/14; G06F 3/153
[52] U.S. Cl. ................................ 364/900; 364/927.2; 364/927.63; 364/521; 340/721
[58] Field of Search ... 364/200 MS File, 900 MS File, 364/518, 521; 340/723–726, 740, 747, 749, 750, 755, 789, 807, 721, 799

[56] References Cited

U.S. PATENT DOCUMENTS

| | | | |
|---|---|---|---|
| 4,706,205 | 11/1987 | Akai et al. | 364/518 |
| 4,723,209 | 2/1988 | Hernandez et al. | 364/300 |
| 4,723,210 | 2/1988 | Barker et al. | 364/300 |
| 4,723,211 | 2/1988 | Barker et al. | 364/300 |
| 4,747,042 | 5/1988 | Ishii et al. | 364/200 |

Primary Examiner—Raulfe B. Zache
Assistant Examiner—Robert B. Harrell
Attorney, Agent, or Firm—Cushman, Darby & Cushman

[57] ABSTRACT

In a block data editing apparatus according to the invention, block data to be stored in a block data storage area is mangaged by a block management table for storing block management data which includes reference position data representing a position on a page where the block data is to be displayed, and pointer data which represents a storage position of the block data in the block data storage area. The block data editing apparatus has a further area for temporarily storing the block data designated to be pasted, and also the reference data and the pointer data which correspond to the designated block data. All the block data can be pasted by a single processing operation, and the apparatus can maintain a specific positional relationship between a block frame and the block data. When pasting is executed, the block management data in which the reference position data and the pointer data are updated, is written in the block management table.

16 Claims, 6 Drawing Sheets

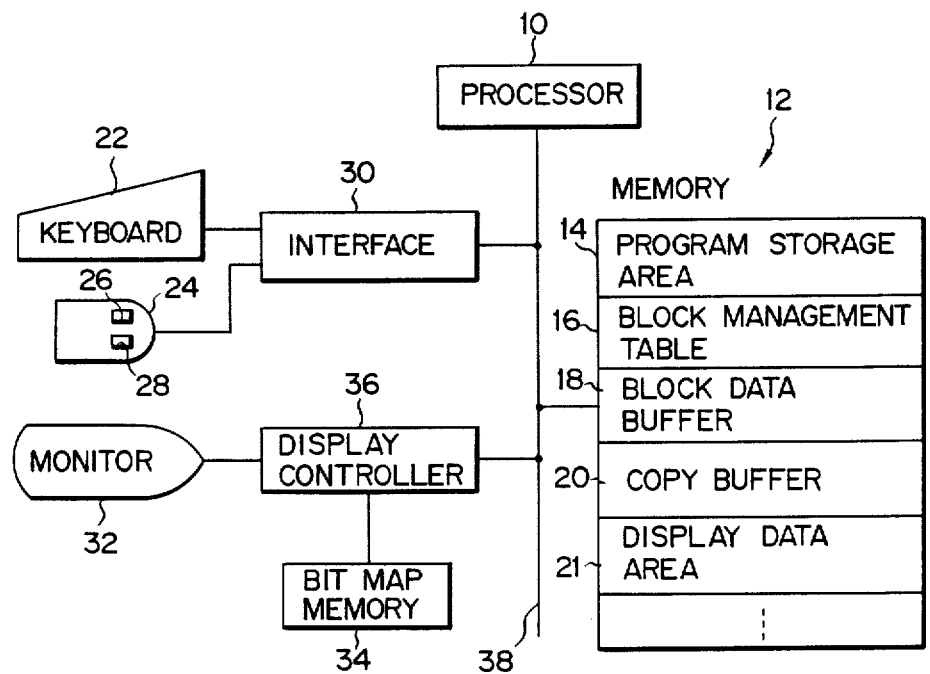
F I G. 1

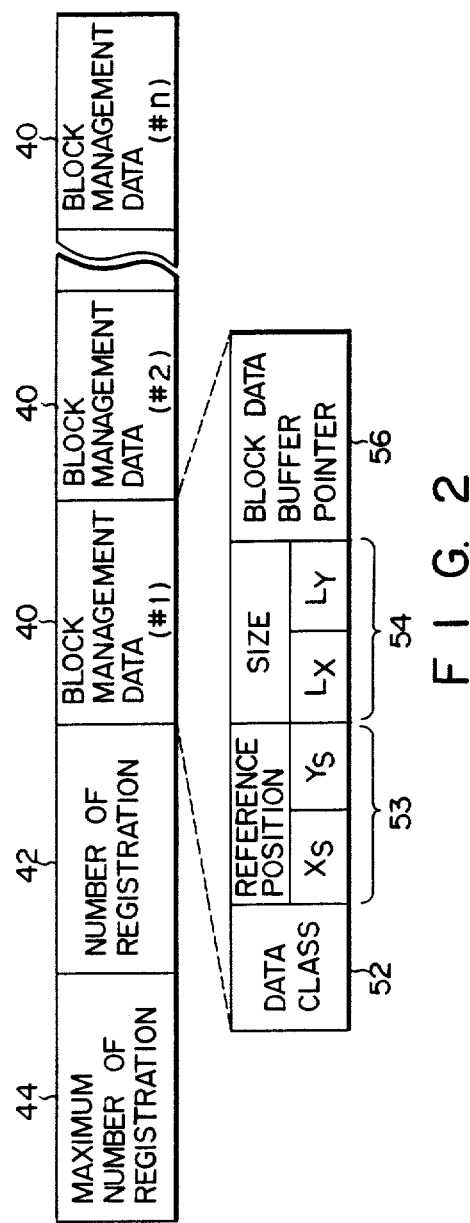
F I G. 2
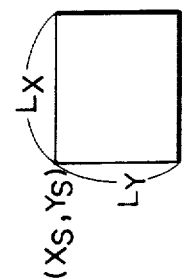
F I G. 3

APPARATUS FOR TRANSFERRING BLOCK DATA IN ORIGINAL FORM AND EDITING THE BLOCK DATA

BACKGROUND OF THE INVENTION

The present invention relates to a block data editing apparatus which is able to move or copy various block data, such as sentences, tables, and graphs on a page, in units of blocks and, more particularly, to a block data editing apparatus which is able to move or copy block data by means of a single processing operation, while maintaining positions of data in a block for a frame of the block.

A block data editing apparatus has recently been developed which can merge and edit various block data, such as sentences, tables, and graphs on a page. When using a conventional block data editing apparatus, a user must designate a frame of a block to be processed first to perform cutting and pasting or copying and pasting of block data. In order to designate the frame, a method of mouse-clicking at a given point in a block to be processed of several block data displayed on a screen is generally adopted. After the block is designated, individual data in the block is cut and pasted or copied and pasted.

Thus, with the conventional block data editing apparatus, in the case of making a plurality of copies of given block data, an operation must be repeated such that block frames each having the same size as that of original block data are produced at desired positions, and data in the original block are sequentially pasted in the respective frames. This results in the imposition of an unduly heavy workload on the user.

In addition, when performing the above operation, it is difficult to make the new block to have the same size as that of the original block, and in the case of figure data processing, it is also difficult to paste the same figures at the same positions in both the blocks.

SUMMARY OF THE INVENTION

The present invention has been developed in consideration of the above situation, and has as its object to provide a block data editing apparatus which is able to cut, copy, and paste display data as block data by means of a single processing operation, and which has a simple arrangement and high accuracy.

In order to achieve the above object, a block data editing apparatus is provided which is capable of editing block data while maintaining a relation of display data and a block frame, comprising:

block data storage means for storing block data input thereinto:

block data managing means for storing reference position data and pointer data for each block data, the reference position data representing a position on a page of the block data to be displayed, and the pointer data representing an address of the block data stored in the block data storage means;

buffer means for temporarily storing designated block data, the reference position data, and pointer data for the designated block data;

display means for determining whether or not the block data is associated with a currently designated page, on the basis of the reference position data corresponding to the block data, respectively, and for reading out the associated block data from the block data storage means, on the basis of the pointer data, so as to display the read-out block data, in accordance with a display instruction; and control means for generating the display instruction, and in accordance with an edit command input thereinto, for selectively reading out the designated block data from the block data storage means, and selectively reading out, from the block data managing means, the reference position data and the pointer data for the designated block data, so as to output the selectively read-out data to the buffer means, for selectively deleting the designated block data output from the block data storage means, and selectively deleting, from the block data managing means, the reference position data and the pointer data for the designated block data, for selectively outputting the designated block data stored in the buffer means to the block data storage means, for selectively updating the reference position data stored in the buffer means, on the basis of a designated position of a designated page, and selectively updating the pointer data in said buffer means, on the basis of the address of the block data selectively output from said block data storage means, so as to output the selectively updated data to the block data managing means.

The block data editing apparatus according to the present invention also comprises:

block data designating means for designating one of the block data read out from a memory, by referring to block management data contained in a block management table which corresponds to and is displayed on a currently designated page, the block data being defined as display data enclosed in a block frame, and the block management data including reference position data representing a position on a page the block data to be displayed and pointer data representing an address of the block data in the memory;

buffer means for selectively and temporarily storing the designated block data by said block data designating means, and the block management data for the designated block data, in accordance with an edit command;

editing means for performing an edit processing for the designated block data, in accordance with the edit command; and updating means for updating the block management data contained in the block management table for a currently designated page, in accordance with the edit processing performed by said editing means.

As has been described above, with the block data editing apparatus according to the present invention, a block frame and block data can be cut and pasted, or copied and pasted by means of a single processing operation with the result that cutting and pasting, or copying and pasting can be performed at high speed. In addition, the apparatus can maintain a specific positional relationship between the frame and the data.

BRIEF DESCRIPTION OF THE DRAWINGS

FIG. 1 is a block diagram showing an arrangement of an embodiment of a block data editing apparatus according to the present invention;

FIG. 2 is a schematic view showing an arrangement of block management table 16 shown in FIG. 1;

FIG. 3 is a schematic view for explaining a block;

DETAILED DESCRIPTION OF THE PREFERRED EMBODIMENT

Figure 4:
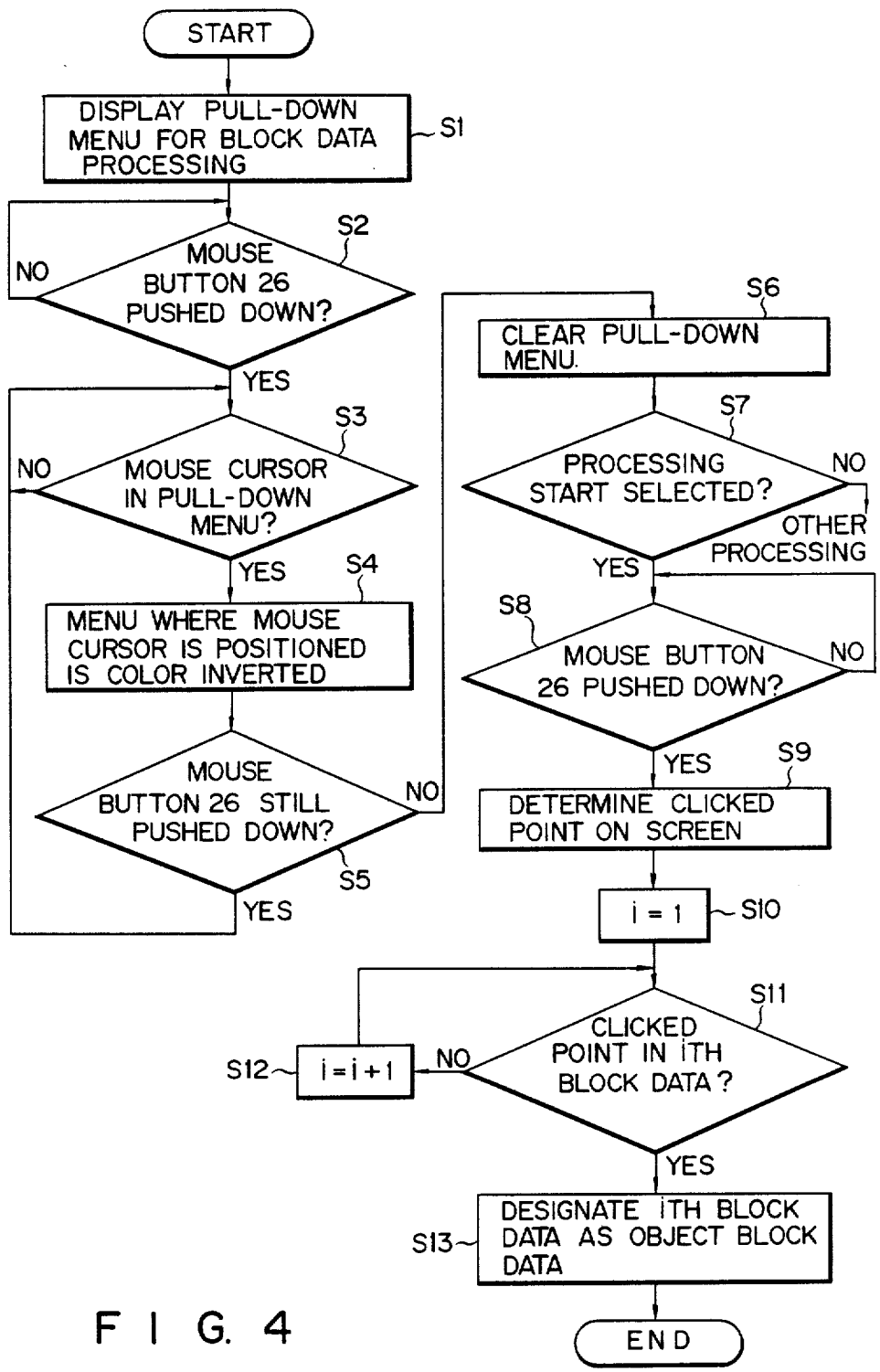
FIG. 4 is a flow chart explaining an operation.

A block data editing apparatus according to the present invention will be described in detail with reference to the accompanying drawings.

First, an arrangement of the block data editing apparatus according to the present invention will be described with reference to FIG. 1. Referring to FIG. 1, processor 10 controls the entire apparatus. System bus 38, to which interface 30, display controller 36, and memory 12 are connected, is connected to processor 10. Mouse 24 having buttons 26 and 28 and keyboard 22 are connected to interface 30 to allow inputting of data or commands. Controller 36 reads out data stored in bit map memory 34 and displays it on monitor 32. Controller 36 also reads out block data to be displayed from memory 12 and develops it on memory 34.

Memory 12 includes program storage area 14, block management table 16, block data buffer 18, copy buffer 20, and display data area 21. Area 14 stores a program for control processing of processor 10. Buffer 18 stores block data to be displayed on monitor 32. If the block data is e.g., a line, it is stored in the form of a start pixel position and an end pixel position. If the block data is a graph, it is stored in the form of not an image but as X- and Y-coordinates. Table 16 stores block management data shown in FIG. 2, of the block data stored in buffer 18. Table 16 will be described in detail later. Buffer 20 temporarily stores object block data during cutting and pasting or copying and pasting. Area 21 stores display data supplied from keyboard 22 or mouse 24.

As shown in FIG. 2, table 16 includes a plurality of block data fields 40 corresponding to the respective block data, number of registration field 42 for storing the number of block management data currently registered in table 16, and maximum number of registration field 44 for storing the maximum registerable number. A block frame of each block data is defined by block reference position data (Xs,Ys) and size data (Lx,Ly), illustrated in FIG. 3.

Each block management data of table 16 includes data class field 52 for storing data representing whether the block data is a sentence, a table, a graph, or a figure, reference position field 53 for storing block reference position data, size field 54 for storing size data of a block frame, and block data buffer pointer field 56 for storing data representing a location stored in buffer 18. Field 53 together with field 54 are called a block position data field.

An operation of an embodiment of the block data editing apparatus according to the present invention will be described below with reference to FIGS. 4 to 8.

Figure 6A:
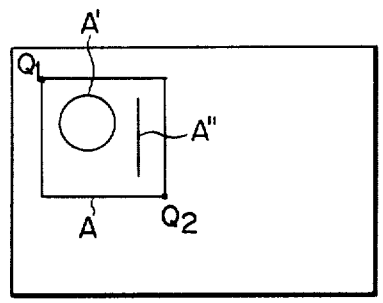
FIG. 6A is a schematic view showing a screen displaying block data.
Figure 7:
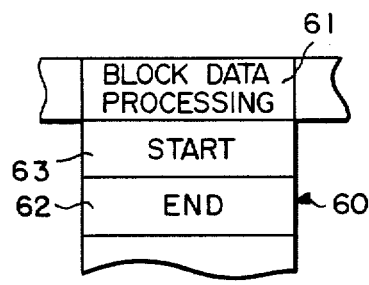
FIG. 7 is a schematic view of a pull-down menu.
Figure 8:
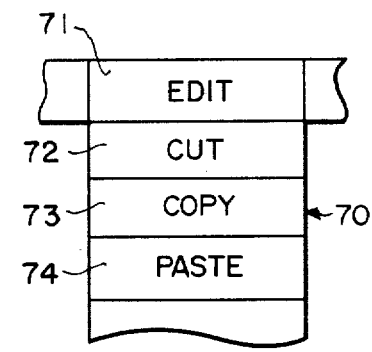
FIG. 8 is a schematic of another pull-down menu.

Assume that block data A containing two figures A' and A" is displayed on monitor 32 as shown in FIG. 6A. In addition, assume that a menu bar consisting of various menus including "BLOCK DATA PROCESSING" 61 and "EDIT" 71 shown in FIGS. 7 and 8 is displayed at an upper portion of a display screen of monitor 32.

Data A is defined as follows. First, data A' and A", in FIG. 6A, are written in area 21 by keyboard 22 or mouse 24. Data A' and A" are read out and developed by controller 36. Thereafter, in order to designate data A, points Q1 and Q2, FIG. 6A, are designated by mouse 24. Therefore, reference positions Xs and Ys are obtained by point Q1, and sizes Lx and Ly are obtained by point Q2. Data A' and A" enclosed in the boundary of click points Q1 and Q2, i.e., the block frame are stored in buffer 18 by processor 10. Thereafter, block management data with respect to data A is generated and stored next to the last block management data of table 16. Data of field 42 is incremented by 1.

In this state, assume that data A is cut and pasted or copied and pasted. In order to designate data A in step S1, mouse 24 is operated first to move a mouse cursor to "BLOCK DATA PROCESSING" 61 of the menu bar. Thereafter, in order to generate a block data processing command, left button 26 of mouse 24 is mouse-clicked. This click instruction is sent to processor 10 through interface 30 and bus 38. Processor 10 determines that the click instruction is a block data processing command and starts the block data processing. First, pull-down menu 60 relating to "BLOCK DATA PROCESSING" 61 as shown in FIG. 7 is read out from area 14 and developed on memory 34 by controller 36. Therefore, menu 60 is displayed on monitor 32.

Processor 10 waits in this state until left button 26 of mouse 24 is pushed down in step S2. When left button 26 of mouse 24 is pushed down, a control loop of steps S3 to 5 is executed.

In step S3, processor 10 determines a menu in menu 60 at which the mouse cursor is positioned while left button 26 of mouse 24 is kept pushed down. If the mouse cursor is positioned at any menu, step S4 is executed. Otherwise, processor 10 waits until the mouse cursor is positioned at a certain menu. In step S4, the menu where the mouse cursor is positioned, is color-inverted. Thereafter, step S5 is executed.

In step S5, if the color-inverted menu is not a desired menu, left button 26 of mouse 24 is kept pushed down, and step S3 is executed again. If the color-inverted menu is the desired menu, left button 26 of mouse 24 is released. In this processing step of the embodiment, "START" 63 is selected as the desired menu from menu 60 shown in FIG. 7. This instruction is sent to processor 10 through interface 30.

When processor 10 determines that the instruction is a processing start command, it causes controller 36 to clear menu 60 from the screen of monitor 32 and to display the data shown in FIG. 6A in step S6. Then, in step S7, processor 10 determines whether the selected menu is "START" 63. If the selected menu is "START", step S8 is executed. Otherwise, e.g., if "END" 62 is selected, the corresponding processing is executed.

In step S8, pushing down of left button 26 of mouse 24, i.e., a mouse click is expected. In order to designate block data to be subjected to block data processing, mouse 24 is so operated to move the mouse cursor into object block data. Thereafter, left button 26 is pushed down. When a mouse click is performed, this information is sent to processor 10, and step S9 is executed.

In step S9, a clicked point is determined on the screen. Thereafter, in a loop of steps S10 to S13, block data stored in buffer 18 and to be subjected to the block data processing is designated on the basis of the determined clicked point. In this example, this block data is data A.

In step S10, block management data number i is set to be "1". In step S11, table 16 in memory 12 is referred to, and block management data written in ith field 40 is read out. Then, processor 10 determines whether the clicked point is in the block frame defined by reference position data and size data written in the block position data field of the ith block management data. If the clicked point is not in the block frame, step S12 is executed, and if the clicked point is in the block frame, step S13 is executed. In step S12, block management data number i is incremented by 1 so as to read out the next block management data. Thereafter, step S11 is executed again.

If the clicked point is in the block frame defined by the ith block management data, processor 10 determines that the block data corresponding to the ith, i.e., the currently readout block management data is the designated object block data, in step S13. Thus, in this example, data A is selected as the object block data.

Figure 5A:
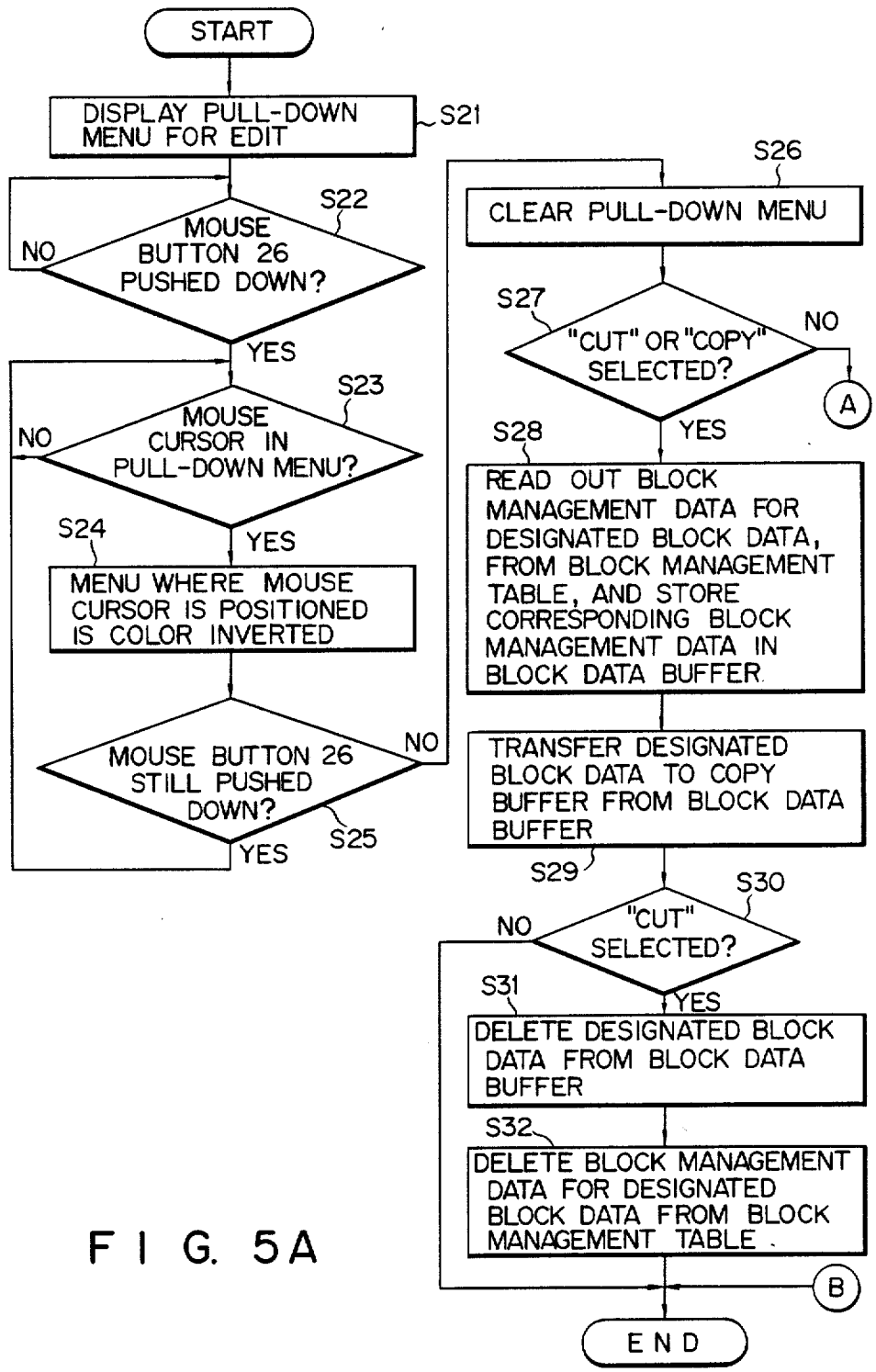
FIG. 5A is a flow chart explaining the cut and copy operations.
Figure 5B:
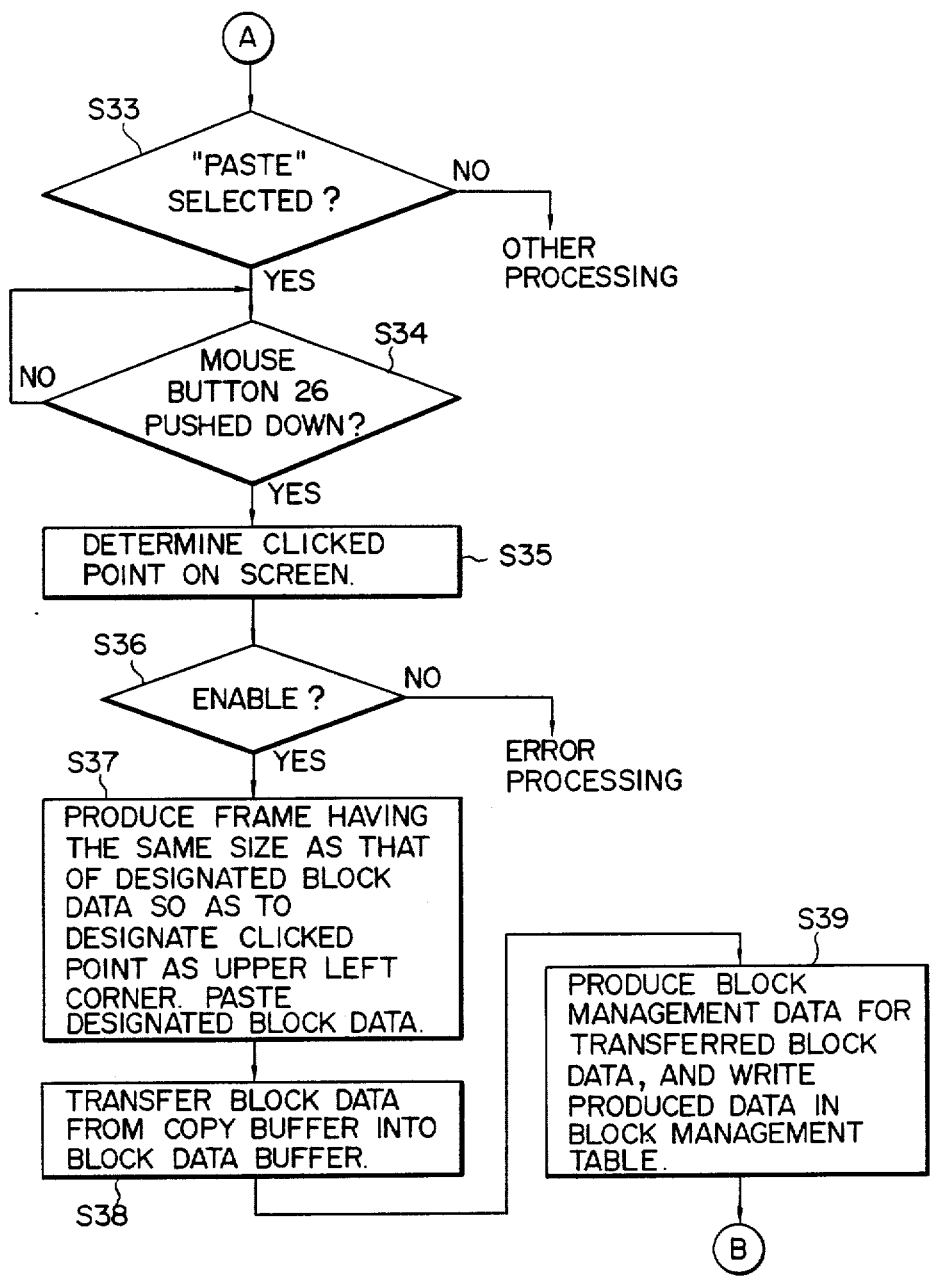
FIG. 5B is a flow chart explaining the paste operation.

When the object block data is selected, in step S21 of FIG. 5A, mouse 24 is so operated as to move the mouse cursor to "EDIT" 71 of the menu bar, and left button 26 of mouse 24 is clicked. This instruction is sent to processor 10 through interface 30, and processor 10 determines that this is an edit command. Processor 10 starts editing, and menu 70 relating to the editing shown in FIG. 8 is displayed on monitor 32. In this state, a desired menu ("CUT" 72 or "COPY" 73 in this case) is selected from menu 70 in steps S22 to S25, as in steps S2 to S5 in FIG. 4.

When left button 26 of mouse 24 is released, processor 10 determines that the desired menu is selected, and menu 70 is cleared and the data shown in FIG. 6A is displayed again in step S26. In step S27, processor 10 determines whether the selected menu is either "CUT" 72 or "COPY" 73. If YES (to be referred to as simply Y hereinafter) in step S27, step S28 is executed, and if NO (to be referred to as simply N hereinafter) in step S27, step S33 is executed.

In step S28, block management data corresponding to designated data A is read out from table 16 and stored in a block management data storage area (not shown) in buffer 20. Subsequently, step S29 is executed, and in accordance with data written in pointer 56 in the read-out block management data, corresponding data A is read out from buffer 18 and stored in a block data storage area (not shown) in buffer 20.

In step S30, processor 10 determines whether the selected menu is "CUT" 72. If Y in step S30, step S31 is executed, and if N, i.e., "CUT" 72 is selected in step S30, editing is completed and the next request is expected.

In step S31, designated data A is deleted from buffer 18, and in step S32, the block management data corresponding to data A is deleted from table 16. If a space is produced in the block management data by the above deleting, the stored block management data is shifted forward. For example, when the 10th block management data is deleted, the 11th block management data and thereafter become the 10th block management data and thereafter. Then, in step S32, the content of field 42 of table 16 is decremented by 1. The processing is thus completed, and the next request is waited.

Assume that in the above-mentioned editing, "EDIT" 71 of the menu bar is selected again and menu "PASTE" 74 of menu 70 is selected in steps S21 to S25 in the same manner as described above when "CUT" 72 or "COPY" 73 is selected, i.e., the designated block data is stored in buffer 20. In this case, processor 10 determines N in step S27, so that step S33 is executed. In step S33, processor 10 determines whether the selected menu is "PASTE" 74. If N in step S33, other processing is executed; and if Y in step S33, step S34 is executed.

Figure 6B:
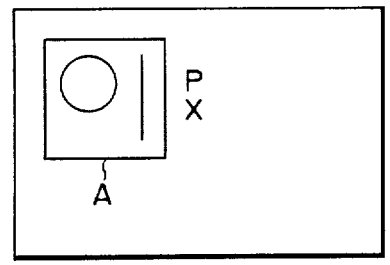
FIG. 6B is a schematic view further illustrating a screen displaying block data.

In step S34, pushing down of left button 26 of mouse 24 is waited. When a mouse click is performed at, e.g., point P on the screen as shown in FIG. 6B, clicked point P is determined on the screen of monitor 32 in step S35. Thereafter, in step S36, on the basis of the size data in the designated block management data stored in buffer 20, processor 10 determines whether designated data A can be pasted in a paste address designated by point P. If N in step S36, error processing is executed. In this error processing, for example, an error message is displayed, and designation of a paste address position is requested again. If Y in step S36, step S37 is executed.

Figure 6C:
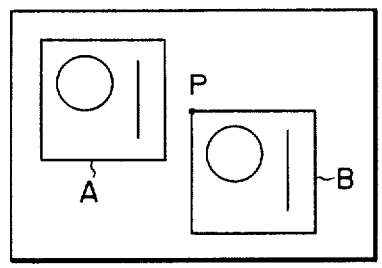
FIG. 6C is a schematic view explaining the cutting operation.

In step S37, as shown in FIG. 6C, point P determined in step S35 is made as an upper left corner, and block frame B having the same size as that of the designated block is produced. This is performed by referring to the block management data stored in buffer 20 and developing the frame on memory 34. Thereafter, in step S38, designated data A stored in buffer 20 is pasted into frame B produced in step S37. That is, in accordance with an instruction from processor 10, controller 36 reads out and develops the block data stored in buffer 20, and stores it in memory 34. Thus, data B is displayed on monitor 32. In addition, in step S38, data A in buffer 20 is transferred as data B to buffer 18.

Figure 6D:
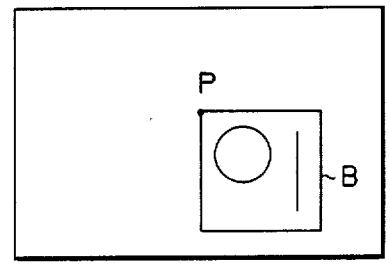

As a result, in the case of cutting and pasting in which "CUT" 72 is designated first and then "PASTE" 74 is designated, all the data in the designated block data are moved to the designated position, as shown in FIG. 6D where B looks as A looked. On the other hand, in the case of copying and pasting in which "COPY" 73 is designated first and then "PASTE" 74 is designated, all the data in the designated block data are copied to the designated position, as shown in FIG. 6C where B is a duplicate of A. Therefore, according to this example in which data A is designated as the object block, data B having the same figure as that of data A is produced using point P as a reference position.

When step S38 is completed, in step S39, block management data for transferred data B is produced in the designated paste address and registered in table 16. At this time, the content of field 42 of table 16 is incremented by 1.

Note that when a plurality of copies identical to block data A must be produced, a "PASTE" 74 selection designating operation and a paste address position designating operation described above may be repeated.

In the above embodiment, a description has been made with reference to the case in which the "PASTE" 74 selection designating operation is performed first and then the paste address position designating operation is performed. However, this operation order may be reversed.

In addition, in the case of pasting, data A is read out from buffer 20 and developed by controller 36. However, data A may be transferred to buffer 18 first to produce block management data, and then controller 36 may develop data A.

Furthermore, a rectangular block frame is designated to perform the graphic processing according to the present invention, but a circle may be designated as a shape of the frame. In this case, for example, the center of a circle is used as reference data, and a radius of the circle is written in one of the size data and "0" is written in the other thereof. Thus, a circular frame can be designated.

Moreover, when a capacity of buffer 18 can be increased, image data may be used as block data.

In the above embodiment, a description has been made with reference to the cutting and pasting or to the copying and pasting with respect to the same page. However, if block management tables are provided to the respective pages, it is obvious that the block data can be moved or copied to another page. In this case, block management data produced in step S39 is stored in a block management table corresponding to a currently designated page. In addition, if the block management table and the block data buffer are constantly maintained, processing using different application software programs can be performed.

What is claimed is:

1. An editing apparatus comprising:
   display data storage means for sequentially storing a plurality of display data blocks, each display data block being stored in a form predetermined in accordance with a type of the display data block;
   display memory means for storing a display data image, the display data image including a plurality of display data block images which correspond to the plurality of display data blocks;
   management data storage means for sequentially storing a plurality of management data blocks, each management data block corresponding to one display data block and including type data representing the type of the corresponding display data block and start position data representing position for the corresponding display data block to be displayed on a current page with respect to a reference position;
   display means for reading out the display data image from said display memory means to display the display data block image on the current page;
   developing means responsive to an input develop command, for sequentially reading out the plurality of display data blocks from said display data storage means and the plurality of management data blocks from said management data storage means and selectively developing each display data block into the corresponding data block image in accordance with the type data of the corresponding management data block and storing the corresponding display data block image in said display memory means in accordance with the start position data of the corresponding management data block;
   buffer means for storing a specific display data block and a specific management data block corresponding to the specific display data block; and
   editing means responsive to an input edit command for editing the plurality of display data blocks and the plurality of management data blocks in order to write as the specific display data block one of the plurality of display data blocks and as the specific management data block one of the plurality of management data blocks in said buffer means, to delete the specific display data block from the plurality of display data blocks and the specific management data block from the plurality of management data blocks, and to write the specific display data block in said display data storage means after the plurality of display data blocks and the specific management data block in said management data storage means after the plurality of management data blocks, and generating and outputting the develop command to said developing means after editing.

2. The apparatus according to claim 1, wherein the plurality of management data blocks are stored in said management data storage means in units of pages and the plurality of display data blocks are stored in said display data storage means in units of pages.

3. The apparatus according to claim 1, wherein said editing means includes means responsive to a cut command as the edit command for reading the specific display data block from said display data storage means and the specific management data block to store the specific display data block and the specific management data block in said buffer means, for selectively deleting the specific display data block from said display data storage means and the specific management data block from said management data storage means, and for generating and outputting the develop command to said developing means.

4. The apparatus according to claim 1, wherein said editing means includes means responsive to a paste command as the edit command, for storing the specific display data block in said display data storage means after the plurality of display data blocks and the specific management data block in said management data storage means after the plurality of management data blocks, and for generating and outputting the develop command to said developing means.

5. The apparatus according to claim 4, wherein each management data block stored in said management data storage means further includes size data representing a size of the corresponding display data block; and said developing means further comprises means responsive to the develop command, for determining from each management data block whether or not the corresponding display data block can be developed within the current page.

6. The apparatus according to claim 1, wherein said editing means includes means responsive to a copy command as the edit command, for reading the specific display data block from said display data storage means and the specific management data block from said management data storage means to store the specific display data block and the specific management data block in said buffer means, storing the specific display data block in said display data storage means after the plurality of display data blocks and the specific management data block in said management data storage means after the plurality of management data blocks, and generating and outputting the develop command to said developing means.

7. The apparatus according to claim 6, wherein each management data block stored in said management data storage means further includes size data representing a size of the corresponding display data block, and said developing means further comprises means responsive to the develop command for determining from each management data block whether or not the corresponding display data block can be developed within the current page.

8. The apparatus according to claim 1, further comprising block data producing means for designating a block on the current page, for producing a new display data block in accordance with the display data image within the block and the display data blocks associated with the block, producing a new management data block in accordance with the block and the management data block corresponding to the display data blocks associated with the block, and for writing the new display data block in said display data storage means after the plurality of display data blocks and the new management data block in said management data storage means after the plurality of management data blocks.

9. A method of editing a specific display data block, comprising:
   editing, in response to an edit command, the specific display data block of a plurality of display data blocks stored in display data storage means, and a specific management data block of a plurality of management data blocks stored in management data storage means, using buffer means, each of the plurality of display data blocks being sequentially stored in a form predetermined in accordance with a type of the display data block, each of the plurality of management data blocks being sequentially stored, corresponding to one display data block and including type data representing the type of the corresponding display data block and start position data representing position for the corresponding display data block to be displayed on a current page with respect to a reference position;
   sequentially reading out, in response to a develop command, the plurality of display data blocks from said display data storage means and the plurality of management data blocks from said management data storage means to selectively develop each display data block into the corresponding display data block image in accordance with the type data of the corresponding management data block; and
   displaying the display data block image on the current page in accordance with the start position data of the corresponding management data block.

10. The method according to claim 9, wherein the plurality of management data blocks are stored in said management storage means in units of pages and the plurality of display data blocks are stored in said display data storage means in units of pages.

11. The method according to claim 9, wherein said editing step includes:
   reading, in response to a cut command at the edit command, the specific display data block from said display data storage means and the specific management data block to store the specific display data block and the specific management data block in said buffer means;
   selectively deleting the specific display data block from said display data storage means and the specific management data block from said management data storage means; and
   generating the develop command.

12. The method according to claim 9, wherein said editing step includes:
   storing, in response to a paste command as the edit command, the specific display data block in said display data storage means after the plurality of display data blocks and the specific management data block in said management data storage means after the plurality of management data blocks; and
   generating the develop command.

13. The method according to claim 12, wherein each management data block stored in said management data storage means further includes size data representing a size of the corresponding display data block, and said developing step further comprises determining from each management data block in response to the develop command, whether or not the corresponding display data block can be developed within the current page.

14. The apparatus according to claim 9, wherein said editing step includes:
   reading, in response to a copy commend as the edit command, the specific display data block from said display data storage means and the specific management data block from said management data storage means;
   storing the specific display data block and the specific management data block in said buffer means;
   storing the specific display data block in said display data storage means after the plurality of display data blocks and the specific management data block in said management data storage means after the plurality of management data blocks; and
   generating the develop command.

15. The method according to claim 14, wherein each management data block stored in said management data storage means further includes size data representing a size of the corresponding display data block, and said developing step further comprises determining from each management data block in response to the develop command, whether or not the corresponding display data block can be developed within the current page.

16. The method according to claim 9, further comprising:
   designating a block on the current page;
   producing a new display data block in accordance with the display data image within the block and the display data blocks associated with the block;
   producing a new management data block in accordance with the block and the management data block corresponding to the display data blocks associated with the block; and
   writing the new display data block in said display data storage means after the plurality of display data blocks and the new management data block in said management data storage means after the plurality of management data blocks.

* * * * *